United States Patent
Li et al.

(10) Patent No.: US 10,146,080 B1
(45) Date of Patent: Dec. 4, 2018

(54) METHOD FOR MANUFACTURING DISPLAY DEVICE

(71) Applicant: WUHAN CHINA STAR OPTOELECTRONICS TECHNOLOGY CO., LTD., Wuhan, Hubei (CN)

(72) Inventors: Yafeng Li, Hubei (CN); Jinfang Wu, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/738,031

(22) PCT Filed: Nov. 30, 2017

(86) PCT No.: PCT/CN2017/113699
§ 371 (c)(1),
(2) Date: Dec. 19, 2017

(30) Foreign Application Priority Data

Nov. 21, 2017 (CN) .......................... 2017 1 1164021

(51) Int. Cl.
*G02F 1/1335* (2006.01)
*G02F 1/1343* (2006.01)

(52) U.S. Cl.
CPC .. *G02F 1/133512* (2013.01); *G02F 1/134309* (2013.01); *G02F 2001/134345* (2013.01); *G02F 2201/52* (2013.01)

(58) Field of Classification Search
CPC ......... G02F 1/133512; G02F 1/133516; G02F 1/134309
See application file for complete search history.

(56) References Cited

U.S. PATENT DOCUMENTS

| 2017/0098690 A1* | 4/2017 | Lee .................... H01L 51/5275 |
| 2017/0168333 A1* | 6/2017 | Kubota ................... G06F 3/044 |
| 2017/0176791 A1* | 6/2017 | Kubota ............ G02F 1/133345 |
| 2018/0151144 A1* | 5/2018 | Kawashima .......... G06F 3/0418 |

* cited by examiner

*Primary Examiner* — Anne M Hines
(74) *Attorney, Agent, or Firm* — Hauptman Ham, LLP

(57) ABSTRACT

The present invention provides a method for manufacturing a display device includes providing an array substrate with a plurality of pixel unit areas formed on a surface thereof; defining a dividing line; dividing the pixel unit areas to a pixel calculating area, a predetermined displaying area, and a predetermined shielding area, and dividing the pixel calculating area to a first part and a second part by the dividing line; calculating areas of sub pixels according to light extraction efficiencies and effective light extraction areas of the sub pixels; forming a shielding layer according to the areas of the sub pixels.

20 Claims, 2 Drawing Sheets

METHOD FOR MANUFACTURING DISPLAY DEVICE

CROSS REFERENCE TO RELATED APPLICATION

This application claims the priority of International Application No. PCT/CN2017/113699, filed on 2017 Nov. 30, which claims priority to Chinese Application No. 201711164021.7, filed on 2017 Nov. 21. The entire disclosures of each of the above applications are incorporated herein by reference.

BACKGROUND OF INVENTION

Field of Invention

The present invention relates to liquid crystal displays, and particularly to a method for manufacturing a display device.

Description of Prior Art

Liquid crystal display panel industry has experienced decades of development, where a shielding layer is used to shield pixel units, and a liquid crystal display panel with four rounded corners has become a new development. However, when a user views the display panel, user will view a boundary of the rounded corners as a zigzag, thus making a poor display effect.

SUMMARY OF INVENTION

The application mainly provides a method for manufacturing a display device with smooth rounded corners.

A method for manufacturing a display device comprises:
providing an array substrate, wherein a surface of the array substrate comprises a plurality of pixel unit areas;
defining a dividing line on the surface of the array substrate;
marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area, and the second part faces the predetermined shielding area;
calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas; and
forming a shielding layer at a light path of the predetermined shielding area and the second part of the pixel calculating area according to the areas of the red sub pixel, the green sub pixel and the blue sub pixel of each of the pixel unit areas, wherein the shielding layer is arranged on one surface of the array substrate away from pixel units.

In the method for manufacturing the display device, the pixel units are arranged in the predetermined displaying area and the first part of the pixel calculating area.

In the method for manufacturing the display device, the pixel units are arranged in the predetermined displaying area, the predetermined shielding area, and the pixel calculating area.

In the method for manufacturing the display device, among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

In the method for manufacturing the display device, among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

In the method for manufacturing the display device, among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

A method for manufacturing a display device comprises:
providing an array substrate, wherein a surface of the array substrate comprises a plurality of pixel unit areas;
defining a dividing line on the surface of the array substrate;
marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area, and the second part faces the predetermined shielding area;
calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas;
forming a shielding layer at a light path of the predetermined shielding area and the second part of the pixel calculating area according to the areas of the red sub pixel, the green sub pixel and the blue sub pixel of each of the pixel unit areas; and
providing a color filter substrate, wherein the shielding layer is formed on the color filter substrate.

In the method for manufacturing the display device, the pixel units are arranged in the predetermined displaying area and the first part of the pixel calculating area.

In the method for manufacturing the display device, the pixel units are arranged in the predetermined displaying area, the predetermined shielding area, and the pixel calculating area.

In the method for manufacturing the display device, among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

In the method for manufacturing the display device, among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

In the method for manufacturing the display device, among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

A method for manufacturing a display device comprises:

providing an array substrate, wherein a surface of the array substrate comprises a plurality of pixel unit areas;

defining a dividing line on the surface of the array substrate;

marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area, and the second part faces the predetermined shielding area;

calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas; and forming a shielding layer at a light path of the predetermined shielding area and the second part of the pixel calculating area according to the areas of the red sub pixel, the green sub pixel and the blue sub pixel of each of the pixel unit areas.

In the method for manufacturing the display device, the pixel units are arranged in the predetermined displaying area and the first part of the pixel calculating area.

In the method for manufacturing the display device, the pixel units are arranged in the predetermined displaying area, the predetermined shielding area, and the pixel calculating area.

In the method for manufacturing the display device, among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

In the method for manufacturing the display device, among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

In the method for manufacturing the display device, among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

In the method for manufacturing the display device, each of a product of the first red areas $S_R$ and the first red light extraction efficiencies $X_R$, a product of the first green areas $S_G$ and the first green light extraction efficiencies $X_G$, and a product of the first blue areas $S_B$ and the first blue light extraction efficiencies $X_B$ is equal to the first effective light extraction areas S.

In the method for manufacturing the display device, each of a product of the second red areas $S_{Rx}$ and the second red light extraction efficiencies $X_{Rx}$, a product of the second green areas $S_{Gx}$ and the second green light extraction efficiencies $X_{Gx}$, and a product of the second blue areas $S_{Bx}$ and the second blue light extraction efficiencies $X_{Bx}$ is equal to the second effective light extraction areas $S_x$.

In the method for manufacturing the display device of this application, in each pixel unit area, according to light extraction efficiencies and effective light extraction areas of the red sub pixel, the green sub pixel and the blue sub pixel, areas of the red sub pixel, the green sub pixel and the blue sub pixel are calculated to form the sub pixels according to the calculation and to obtain a display device with a good display effect.

DETAILED DESCRIPTION OF PREFERRED EMBODIMENTS

Figure 1:
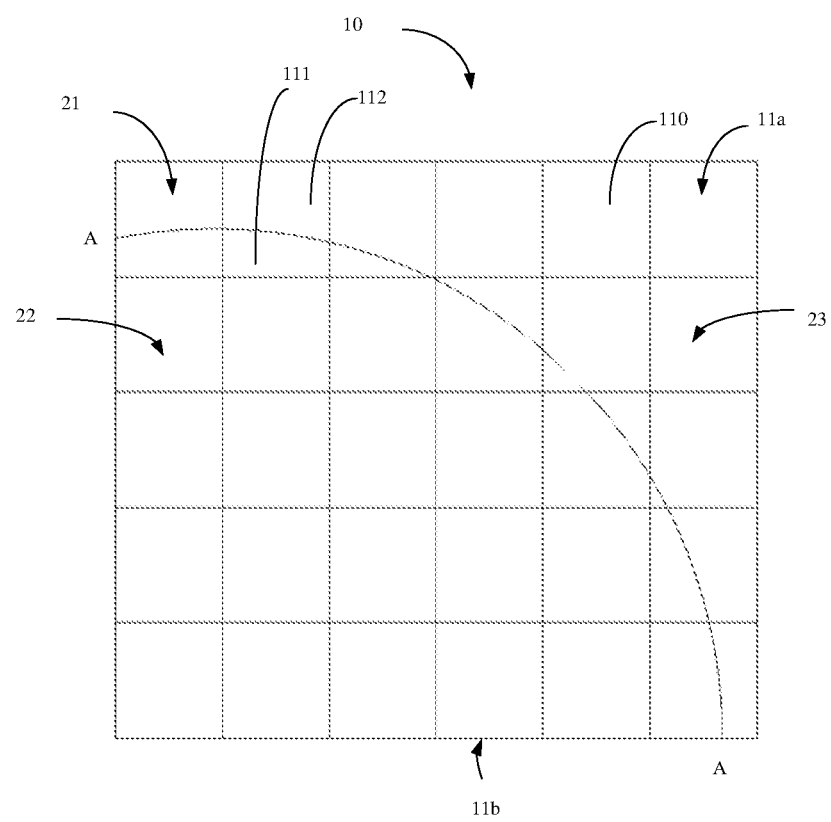
FIG. 1 is a planform of an array substrate of a method for manufacturing a display device according to one exemplary embodiment of the present disclosure.
Figure 2:
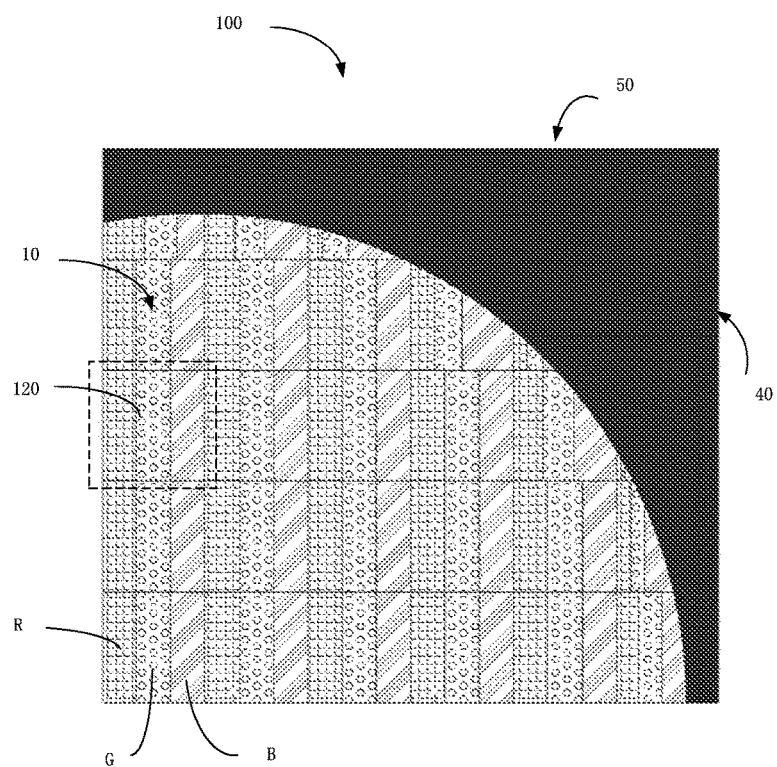
FIG. 2 is a perspective drawing of an array substrate and a color filter substrate of the method for manufacturing the display device according to one exemplary embodiment of the present disclosure.

Referring to FIGS. 1-2, this application provides a method for manufacturing a display device 100.

Firstly, an array substrate 10 is provided. A surface 11a of the array substrate 10 comprises a plurality of pixel unit areas 110.

And, the array substrate 10 can be a glass substrate.

Secondly, a dividing line A-A is defined on the surface 11a of the array substrate 10.

Thirdly, the pixel unit areas 110 passed by the dividing line A-A are marked as a pixel calculating area 21. The pixel unit areas 110 arranged at one side of the pixel calculating area 21 is marked as a predetermined displaying area 22. The pixel unit areas 110 arranged at the other side of the pixel calculating area 21 is marked as a predetermined shielding area 23. Each of the pixel unit areas 110 in the pixel calculating area 21 is divided to a first part 111 and a second part 112 by the dividing line A-A. The first part 111 faces the predetermined displaying area 22, and the second part 112 faces the predetermined shielding area 23.

Fourthly, areas of a red sub pixel, a green sub pixel and a blue sub pixel of each of the pixel unit areas 110 is calculated according to light extraction efficiencies and effective light extraction areas of the red sub pixel, the green sub pixel and the blue sub pixel of each of the pixel unit areas 110.

In one exemplary embodiment, among the pixel unit areas 110 arranged in the predetermined displaying area 22, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same. The array substrate 10 can be used for a flat panel display.

In one exemplary embodiment, among the pixel unit areas 110 arranged in the predetermined displaying area 22, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different. The array substrate 10 can be used for a flat panel display, and can be used for a curved display.

In one exemplary embodiment, among the first parts 111 of each of the pixel unit areas 110 arranged in the pixel calculating area 21, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

In one exemplary embodiment, each of a product of the first red areas $S_R$ and the first red light extraction efficiencies $X_R$, a product of the first green areas $S_G$ and the first green light extraction efficiencies $X_G$, and a product of the first blue areas $S_B$ and the first blue light extraction efficiencies $X_B$ is equal to the first effective light extraction areas S. Among the pixel unit areas 110 arranged in the predetermined displaying area 22, $S_R*X_R=S_G*X_G=S_B*X_B=S$.

In one exemplary embodiment, each of a product of the second red areas $S_{Rx}$ and the second red light extraction efficiencies $X_{Rx}$, a product of the second green areas $S_{Gx}$ and the second green light extraction efficiencies $X_{Gx}$, and a product of the second blue areas $S_{Bx}$ and the second blue light extraction efficiencies $X_{Bx}$ is equal to the second effective light extraction areas $S_x$. Among the first parts 111 of each of the pixel unit areas 110 arranged in the pixel calculating area 21, $S_{Rx}*X_{Rx}=S_{Gx}*X_{Gx}=S_{Bx}*X_{Bx}=Sx$.

The effective light extraction areas S and the light extraction efficiencies X of the red sub pixel, the green sub pixel and the blue sub pixel can be pre-established by cold and warm tones or backlight source composition.

In one exemplary embodiment, the pixel units 120 are arranged in the predetermined displaying area 22 and the first parts 111 of the pixel calculating area 21.

In one exemplary embodiment, the pixel units 120 are arranged in the predetermined displaying area 22, the predetermined shielding area 23, and the pixel calculating area 23.

Finally, a shielding layer 40 is formed at a light path of the predetermined shielding area 23 and the second part 112 of the pixel calculating area 21 according to the areas of the red sub pixel, the green sub pixel and the blue sub pixel of each of the pixel unit areas.

In one exemplary embodiment, the shielding layer 40 can be arranged on one surface 11b of the array substrate 10 away from pixel units 120. The surface 11a and the surface 11b are defined in two sides of the array substrate 10.

And, the method for manufacturing the display device of this application further comprises providing a color filter substrate 50. The shielding layer 40 is formed on the color filter substrate 50. The shielding layer 40 can be formed on one side of the color filter substrate 50 facing the array substrate 10.

In the method for manufacturing the display device of this application, in each pixel unit area, according to light extraction efficiencies and effective light extraction areas of the red sub pixel, the green sub pixel and the blue sub pixel, areas of the red sub pixel, the green sub pixel and the blue sub pixel are calculated to form the sub pixels according to the calculation and to obtain a display device with a good display effect.

A method for manufacturing a display device of this application is described in detail in accordance with the above contents with the specific preferred examples, and the present disclosure is used to help understand the invention. And, for a person of ordinary skill in the art, on the premise of keeping the conception of the present disclosure, the technical personnel can also make simple deductions or replacements. In conclusion, this present disclosure is not limited to the specific examples.

What is claimed is:

1. A method for manufacturing a display device, comprising:

providing an array substrate, wherein a surface of the array substrate comprises a plurality of pixel unit areas;

defining a dividing line on the surface of the array substrate;

marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area and the second part faces the predetermined shielding area;

calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas; and forming a shielding layer at a light path of the predetermined shielding area and the second part of the pixel calculating area according to the areas of the red sub pixel, the green sub pixel and the blue sub pixel of each of the pixel unit areas, wherein the shielding layer is arranged on one surface of the array substrate away from pixel units.

2. The method for manufacturing the display device of claim 1, wherein the pixel units are arranged in the predetermined displaying area and the first part of the pixel calculating area.

3. The method for manufacturing the display device of claim 1, wherein the pixel units are arranged in the predetermined displaying area, the predetermined shielding area, and the pixel calculating area.

4. The method for manufacturing the display device of claim 1, wherein among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

5. The method for manufacturing the display device of claim 1, wherein among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

6. The method for manufacturing the display device of claim 1, wherein among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

7. A method for manufacturing a display device, comprising:

providing an array substrate, wherein a surface of the array substrate comprises a plurality of pixel unit areas;

defining a dividing line on the surface of the array substrate;

marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area, and the second part faces the predetermined shielding area;

calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas;

forming a shielding layer at a light path of the predetermined shielding area and the second part of the pixel calculating area according to the areas of the red sub pixel, the green sub pixel and the blue sub pixel of each of the pixel unit areas; and providing a color filter substrate, wherein the shielding layer is formed on the color filter substrate.

8. The method for manufacturing the display device of claim 7, wherein the pixel units are arranged in the predetermined displaying area and the first part of the pixel calculating area.

9. The method for manufacturing the display device of claim 7, wherein the pixel units are arranged in the predetermined displaying area, the predetermined shielding area, and the pixel calculating area.

10. The method for manufacturing the display device of claim 7, wherein among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

11. The method for manufacturing the display device of claim 7, wherein among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

12. The method for manufacturing the display device of claim 7, wherein among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

13. A method for manufacturing a display device, comprising:
  providing an array substrate, wherein a surface of the array substrate comprises a plurality of pixel unit areas;
  defining a dividing line on the surface of the array substrate;
  marking the pixel unit areas passed by the dividing line as a pixel calculating area, marking the pixel unit areas arranged on one side of the pixel calculating area as a predetermined displaying area, and marking the pixel unit areas arranged on the other side of the pixel calculating area as a predetermined shielding area, wherein each of the pixel unit areas in the pixel calculating area is divided into a first part and a second part by the dividing line, the first part faces the predetermined displaying area, and the second part faces the predetermined shielding area;
  calculating areas of a red sub pixel, a green sub pixel and a blue sub pixel of each of the pixel unit areas according to light extraction efficiencies and effective light extraction areas of the red sub pixel, the green sub pixel, and the blue sub pixel of each of the pixel unit areas; and
  forming a shielding layer at a light path of the predetermined shielding area and the second part of the pixel calculating area according to the areas of the red sub pixel, the green sub pixel and the blue sub pixel of each of the pixel unit areas.

14. The method for manufacturing the display device of claim 13, wherein the pixel units are arranged in the predetermined displaying area and the first part of the pixel calculating area.

15. The method for manufacturing the display device of claim 13, wherein the pixel units are arranged in the predetermined displaying area, the predetermined shielding area, and the pixel calculating area.

16. The method for manufacturing the display device of claim 13, wherein among the pixel unit areas arranged in the predetermined displaying area, a plurality of first effective light extraction areas S are same, a plurality of first red areas $S_R$ of the red sub pixels are same, a plurality of first green areas $S_G$ of the green sub pixels are same, a plurality of first blue areas $S_B$ of the blue sub pixels are same, a plurality of first red light extraction efficiencies $X_R$ of the red sub pixels are same, a plurality of first green light extraction efficiencies $X_G$ of the green sub pixels are same, and a plurality of first blue light extraction efficiencies $X_B$ of the blue sub pixels are same.

17. The method for manufacturing the display device of claim 13, wherein among the pixel unit areas arranged in the predetermined displaying area, a plurality of first effective light extraction areas S are same, a plurality of first red areas $S_R$ of the red sub pixels are different, a plurality of first green areas $S_G$ of the green sub pixels are different, a plurality of first blue areas $S_B$ of the blue sub pixels are different, a plurality of first red light extraction efficiencies $X_R$ of the red sub pixels are different, a plurality of first green light extraction efficiencies $X_G$ of the green sub pixels are different, and a plurality of first blue light extraction efficiencies $X_B$ of the blue sub pixels are different.

18. The method for manufacturing the display device of claim 13, wherein among the first parts of each of the pixel unit areas arranged in the pixel calculating area, a plurality of second effective light extraction areas $S_x$ are different, a plurality of second red areas $S_{Rx}$ of the red sub pixels are different, a plurality of second green areas $S_{Gs}$ of the green sub pixels are different, a plurality of second blue areas $S_{Bx}$ of the blue sub pixels are different, a plurality of second red light extraction efficiencies $X_{Rs}$ of the red sub pixels are different, a plurality of second green light extraction efficiencies $X_{Gs}$ of the green sub pixels are different, and a plurality of second blue light extraction efficiencies $X_{Bs}$ of the blue sub pixels are different.

19. The method for manufacturing the display device of claim 16, wherein each of a product of the first red areas $S_R$ and the first red light extraction efficiencies $X_R$, a product of the first green areas $S_G$ and the first green light extraction efficiencies $X_G$, and a product of the first blue areas $S_B$ and the first blue light extraction efficiencies $X_B$ is equal to the first effective light extraction areas S.

20. The method for manufacturing the display device of claim 18, wherein each of a product of the second red areas $S_{Rx}$ and the second red light extraction efficiencies $X_{Rx}$, a product of the second green areas $S_{Gx}$ and the second green light extraction efficiencies $X_{Gx}$, and a product of the second blue areas $S_{Bx}$ and the second blue light extraction efficiencies $X_{Bx}$ is equal to the second effective light extraction areas $S_x$.

* * * * *